No. 703,597.  
S. L. KISTLER.  
COMB CLEANER.  
(Application filed Mar. 13, 1902.)

Patented July 1, 1902.

(No Model.)

WITNESSES  
Chas. L. Hyde.  
M. L. Nickelson.

INVENTOR  
Samuel L. Kistler  
BY Hazard & Harpham  
ATTORNEYS.

UNITED STATES PATENT OFFICE.

SAMUEL L. KISTLER, OF LOS ANGELES, CALIFORNIA.

COMB-CLEANER.

SPECIFICATION forming part of Letters Patent No. 703,597, dated July 1, 1902.

Application filed March 13, 1902. Serial No. 98,096. (No model.)

*To all whom it may concern:*

Be it known that I, SAMUEL L. KISTLER, a citizen of the United States, residing at Los Angeles, in the county of Los Angeles, State of California, have invented new and useful Improvements in Comb-Cleaning Machines, of which the following is a specification.

My invention relates to a machine for cleaning combs used in dressing the hair; and the object thereof is to provide a simple and efficient machine which will quickly remove the dirt from the comb and will retain the dirt in the machine. I accomplish this object by the machine described herein, and illustrated in the accompanying drawings, in which—

Figure 1:
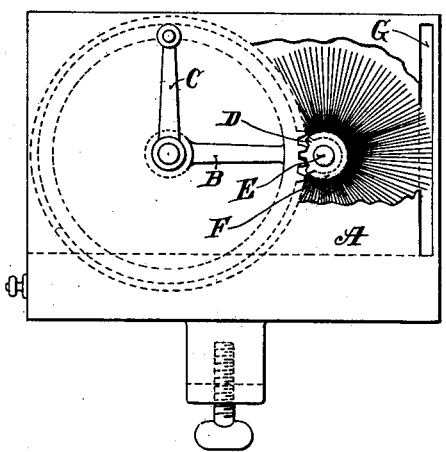
Figure 2:
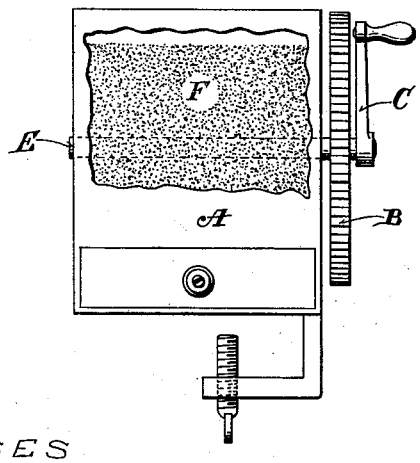

Figure 1 is a side view, partly broken away, of my comb-cleaning machine. Fig. 2 is an end view of the same.

In the drawings, A is a box, on the side of which is mounted the driving-gear B, which may be a friction or a cog gear. The driving-gear is provided with a crank C, by means of which it is operated, and it meshes with a small pinion D, rigidly mounted on the end of shaft E. On shaft E is rigidly mounted the cleaning-brush F. Box A is provided with slots G in the opposite sides thereof, which permit the passage therethrough of the comb to be cleaned, so that it will contact with the cleaning-brush. It is also provided with a removable drawer H in the bottom thereof, in which the dirt collects and which can be removed for cleaning.

I is a clamp affixed to the bottom of the box, by means of which the machine is attached to a table or dresser.

In the operation of my machine the operator imparts motion to the cleaning-brush by means of the crank and connected mechanism with one hand, and with the other he brings the comb to be cleaned into contact with the revolving brush by passing the same through the slot in the end of the box. The brush removes the dirt from the comb and deposits it in the drawer, from which it is removed when desired. If desired, the gears may be mounted within the box.

Having described my invention, what I claim as new, and desire to secure by Letters Patent, is—

1. A comb-cleaning machine comprising a closed receptacle; a driving and a smaller driven gear mounted on said receptacle the shaft of the driven gear passing into the interview of the receptacle; a brush within said receptacle mounted upon the shaft of the driven gear; a slot in said receptacle adapted for the passage of a comb therethrough to bring the teeth thereof in contact with the periphery of the brush; and means to impart motion to the driving-gear.

2. A comb-cleaning machine comprising a closed receptacle; a driving and a smaller driven gear mounted within said receptacle the shaft of the driving-gear projecting through the side of the receptacle and being provided with an operating-lever; a cleaning-brush within the receptacle mounted on the shaft of the driven gear; slots in the side of the receptacle adapted for the passage of the comb therethrough in contact with the brush.

3. A comb-cleaning machine comprising a closed receptacle; a driving and a smaller driven gear mounted on shafts within said receptacle; a brush within the receptacle mounted upon the shaft of the driven gear; oppositely-disposed slots in the sides of the receptacle adapted to permit the passage therethrough of a comb in contact with the periphery of the brush; means to impart motion to the driving-gear; a removable drawer in the bottom of the receptacle adapted to receive the dirt removed from the comb.

In witness that I claim the foregoing I have hereunto subscribed my name this 7th day of March, 1902.

SAMUEL L. KISTLER.

Witnesses:
G. E. HARPHAM,
M. C. NICKELESON.